(12) United States Patent
Lundberg et al.

(10) Patent No.: US 7,220,494 B2
(45) Date of Patent: *May 22, 2007

(54) METAL DUSTING RESISTANT PRODUCT

(75) Inventors: Mats Lundberg, Sandviken (SE);
Johan Hernblom, Sandviken (SE);
Kenneth Göransson, Gävle (SE); Peter Szåkalos, Stockholm (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/921,943

(22) Filed: Aug. 20, 2004

(65) Prior Publication Data

US 2005/0079378 A1    Apr. 14, 2005

(30) Foreign Application Priority Data

Aug. 28, 2003    (SE) .................................... 0302320

(51) Int. Cl.
*C22C 9/01*    (2006.01)
*B32B 20/00*    (2006.01)
*C23C 30/00*    (2006.01)

(52) U.S. Cl. ............... 428/677; 428/675; 428/676; 420/489; 420/490; 420/486; 427/405

(58) Field of Classification Search ............... 428/674; 148/532; 420/489
See application file for complete search history.

(56) References Cited

U.S. PATENT DOCUMENTS

| | | | |
|---|---|---|---|
| 2,270,716 A * | 1/1942 | Morris | 420/489 |
| 2,778,733 A | 1/1957 | Frejacques | |
| 3,721,535 A * | 3/1973 | Pryor et al. | 428/675 |
| 3,726,987 A * | 4/1973 | Pryor et al. | 174/50.61 |
| 3,788,902 A * | 1/1974 | Shapiro | 148/684 |
| 3,993,479 A * | 11/1976 | Cheskis et al. | 420/489 |
| 4,071,359 A | 1/1978 | Cheskis et al. | |
| 4,088,475 A * | 5/1978 | Tyler et al. | 75/10.45 |
| 4,498,121 A * | 2/1985 | Breedis et al. | 361/764 |
| 4,500,028 A * | 2/1985 | Breedis et al. | 228/117 |
| 4,500,029 A * | 2/1985 | Yerman | 228/123.1 |
| 4,805,009 A * | 2/1989 | Pryor et al. | 257/729 |

(Continued)

FOREIGN PATENT DOCUMENTS

DE    390917    2/1924

(Continued)

OTHER PUBLICATIONS

MatWeb Material Property Data, data for UNS N06600, UNS N06601, UNS N08810, UNS N08811, no date.*

(Continued)

*Primary Examiner*—John J. Zimmerman
(74) *Attorney, Agent, or Firm*—Drinker Biddle & Reath LLP (57) ABSTRACT

A product resistant or immune to carburization, metal dusting, coking, oxidation, and having sufficient mechanical strength for use at temperatures greater than 400° C. The product consists of a load-bearing member and a corrosion resistant member, wherein the corrosion resistant member is a Cu—Al-alloy comprising Si. The product can be used in CO-containing atmospheres, and/or hydrocarbon containing atmospheres or solid carbon containing processes. A method of resisting carburization, metal dusting, coking and oxidation is also disclosed.

40 Claims, 4 Drawing Sheets

U.S. PATENT DOCUMENTS

| | | | |
|---|---|---|---|
| 5,026,441 A * | 6/1991 | Kim et al. | 148/402 |
| 5,259,547 A * | 11/1993 | Hardwick | 228/107 |
| 5,296,057 A * | 3/1994 | Baba et al. | 148/436 |
| 5,472,796 A * | 12/1995 | Breedis et al. | 428/679 |
| 5,580,669 A * | 12/1996 | Beers et al. | 428/660 |
| 5,863,418 A | 1/1999 | Heyse et al. | |
| 6,277,499 B1 * | 8/2001 | Beers et al. | 428/548 |
| 7,041,252 B2 * | 5/2006 | Szakalos et al. | 420/489 |
| 2001/0008156 A1 * | 7/2001 | Neill | 148/519 |
| 2001/0023607 A1 * | 9/2001 | Usui et al. | 72/326 |
| 2004/0005239 A1 * | 1/2004 | Szakalos et al. | 420/489 |
| 2005/0079091 A1 | 4/2005 | Lundberg et al. | |
| 2005/0173300 A1 | 8/2005 | Szakalos et al. | |

FOREIGN PATENT DOCUMENTS

| | | |
|---|---|---|
| DE | 690333 | 4/1940 |
| DE | 1 154 642 | 9/1960 |
| EP | 0 903 424 A1 | 3/1999 |
| GB | 519902 | 4/1940 |
| GB | 2 066 696 A | 7/1981 |
| GB | 2 075 058 A | 11/1981 |
| WO | 03/014263 A1 | 2/2003 |

OTHER PUBLICATIONS

Lundberg et al., U.S. Appl. No. 10/921,888 filed Aug. 20, 2004 entitled "Copper-Base Alloy and its Use".

Macken, P. J. and Smith, A. A. The Aluminum Bronzes, CDA Pub No. 31 [online], 1966 [retrieved on Dec. 9, 2004]. Retrieved from the Internet:< URL: http://www.cda.org.uk/Megab2/corr_rs/pub31/default.htm>, no month given.

Szakalos, P., "Mechanisms of metal dusting on stainless steel", *Licenciate thesis*, 2002, ISBN 91-7283-260-6, no month given.

* cited by examiner

METAL DUSTING RESISTANT PRODUCT

RELATED APPLICATION DATA

This application is based on and claims priority under 37 U.S.C. §119 to Swedish Application No. 0302320-7, filed Aug. 28, 2003, the entire contents of which are incorporated herein by reference.

FIELD OF THE DISCLOSURE

The present disclosure relates to products that are resistant or immune to carburization, metal dusting and coking, and resistant to oxidation, and that furthermore have sufficient mechanical strength for use at temperatures greater than 400° C. and at high pressures and that have the ability to retain the resistance or immunity to the above mentioned corrosion types even for longer periods of time. The disclosure also relates to the use of said product in the construction of components in CO-containing atmospheres, and/or hydrocarbon-containing atmospheres or solid-carbon-containing processes.

STATE OF THE ART

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Developments of the reforming processes in the petrochemical industry during the last years have led to significant process efficiency improvements. One such example is the development of large pore zeolite catalysts, doped with specific metals, rendering the catalysts with a high selectivity, which makes them suitable for precision reforming and/or -synthesis. This has allowed more effective and economic production of a range of highly demanded commercial liquids based on hydrocarbon feedstocks. However, the catalysts were soon discovered to be sensitive to sulfur poisoning. In order to overcome this disadvantage, techniques to desulphurize the hydrocarbon feed have been developed. Later, such catalysts were also found to be quickly deactivated by water, thus corresponding protecting technologies to lower the water content in the process gas streams were developed.

The low-sulfur and low-water conditions led to the discovery of coke-formation and plugging within reactor systems; an effect which later was found to relate back to a severe form of disintegrating attack on metallic construction materials, which affects parts of the equipment such as furnace tubes, piping, reactor walls by, e.g., shortening the service time of the whole plant. This metal disintegrating mechanism was already known since the 1940's as so-called "metal dusting". The metal dusting process is known to be inhibited by the presence of sulphur in the carbon containing gas. Increased environmental demands and the requirements of newly developed catalysts have made low-sulphur conditions necessary, which has led to an increase in metal dusting related failures.

As earlier mentioned, metal dusting is a form of catastrophic carburization, where the metal disintegrates rapidly into coke and pure metal or other types of metal rich reaction products. Metal dusting is in the present case taken to mean the process whereby a metal or an alloy is attacked by a carbon rich gas and corroded into a mixture of coke/carbon and metal rich particles. Metal dusting typically occurs in gases that are initially supersaturated with respect to carbon, i.e., having a carbon activity greater than unity. The corrosion products of the metal dusting process are metal rich compounds and carbon rich compounds. The carbon rich compounds are typically in the form of coke, i.e., a solid carbonaceous deposit that can contain varying concentrations of, e.g., hydrogen, nitrogen, oxygen, etc. The metal rich compounds can be different depending on, e.g., the oxygen content of the system and the alloy composition, as well as the operating temperature and pressure. Typical metal rich compounds are metal carbides, metallic alloys with dissolved carbon and oxides of the component metals in the alloy.

Metal dusting occurs most commonly when a carbon containing gas is cooled from a high temperature at which it is at or near equilibrium. Often this equilibrium state is reached with the help of catalysts, which means that at the initial equilibrium, the gas phase reaction rates are low. During cooling, the gas will not be able to equilibrate, due to sluggish kinetics, and as a consequence the gas becomes strongly carburizing. In most applications where metal dusting is a problem, such as, for example, in steam reforming applications processes, the gas is cooled in order to retain the equilibrium achieved at high temperature over a catalyst. It is thus a feature of such processes that metal dusting can occur, and it is not known to design the process so as to avoid metal dusting, carburization or coking entirely. According to P. Szakalos, "Mechanisms of metal dusting on stainless steel", Licenciate thesis, 2002, ISBN 91-7283-260-6, metal dusting is thus likely to occur in those components where the gas is cooled, such as waste heat boiler, steam superheaters and in heat exchange reformer units. The temperature range in which metal dusting is most likely to occur is 400–800° C., but it can also occur at higher temperatures.

The atomized metal particles produced by metal dusting can be transported with the process gas, accumulate downstream on various reactor parts, and throughout the whole reactor system, metastasize catalytic coking that can create blockage.

It is generally appreciated that metal dusting is a large concern in the production of hydrogen and syngas ($H_2$/CO mixtures). In these plants, methane and various other higher hydrocarbons are reformed or partially oxidized to produce hydrogen and carbon monoxide in various amounts for use in producing other higher molecular-weight organic compounds. Increased reaction and heat-recovery efficiencies of the processes necessitate operating process equipment at conditions that favor metal dusting.

The need for increased heat recovery in ammonia-synthesis processes has caused metal dusting problems in the heat-recovery section of the reformed-gas system as well as in the reformer itself.

Metal dusting is also a problem in direct iron-ore reduction plants wherein reformed methane is dried and reheated to enhance ore-reduction efficiencies.

Metal dusting occurs in the reformer, reformed-gas reheater and piping up-stream of the ore-reduction.

Metal dusting is also experienced in the heat-treating industry in equipment that handles items being treated (annealed, carburized). Gases used in heat treating mix with oil residue on the items to form gases that are chemically favorable for metal dusting. Furthermore, gas mixtures used for carburizing can also cause metal dusting if control of chemistry of the process is not taken care of. Also, petroleum refineries experience metal dusting in processes involving hydro-dealkylation and catalyst regeneration systems of "plat-former" units.

Other processes wherein metal dusting occurs are nuclear plants that employ carbon dioxide for cooling the equipment in the recycle-gas loop of coal-gasification units, in fired heaters handling hydrocarbons at elevated temperatures, iron-making blast furnaces in steel mills, and fuel cells using molten salts and hydrocarbons.

In recent years, there has been a strong emphasis on reforming and synthesis technology developments to make possible commercialization of remotely located, so-called "stranded gas reserves". The synthesis step, based on further developments of the Fischer-Tropsch process, will require the use of highly severe metal dusting causing compositions of the synthesis gas, with lower steam to carbon ratios and higher $CO/CO_2$ ratios, which will cause severe metal dusting. However, only small steps in the development in this direction have been taken due to lack of material with sufficient resistance to metal dusting.

The solutions that are used nowadays in order to provide protection to metal dusting and reduce the formation of coke is to use advanced nickel-or iron-base alloys with high contents of chromium and certain additions of aluminium. Several methods of surface modification, which are based on diffusion coating techniques or coatings by overlay welding, laser fusion, chemical vapor deposition (CVD), physical vapor deposition (PVD) or sputtering have been tested. Many of those methods include elements based on transition metals, such as iron, nickel and cobalt, which are known for their catalytic properties referencing to their promotion of coke formation.

There are metals, such as Cu and Sn, which are known to be resistant or immune to carburization and coke formation. Sn has a too low melting point to be useful above 300° C. and both Cu and Sn have insufficient oxidation resistance for use in high temperature applications. This oxidation resistance is important in such cases where the solid coke is periodically removed by oxidation in steam and air. Consequently, the metal surfaces, which are in contact with the carburizing process gas, should also have adequate oxidation resistance. In most applications, this excludes Sn alloys and pure Cu and low alloyed Cu as useful alternative carburization-resistant materials. Even if the decoking step can be excluded in some processes, the start-up procedures after an inspection or other stops in operation which cause changes in temperature and pressure will be made easier by using an alloy having certain oxidation-resistance. Further, process variations in temperature and feedstock quality as well as the function of up-stream process equipment can lead to contamination of the process gases with, e.g., sulfur, chlorine, alkali metallic compounds, water vapor and/or oxygen. A copper alloy, which is not protected by any oxide on the surface can thereby be affected by considerable corrosion and erosion. Likewise, chromium-containing copper alloys which are protected by chromium oxide, can also be damaged by the above-mentioned compounds, because the oxidation resistance of the chromium oxide is limited. Finally, copper has, and in an even higher degree tin, high vapor pressures at temperatures over 500° C., which results in that, when these elements are present on the surface of the metal, vapor of said elements can be transported into the process system and can lead to contamination of, e.g., construction material, process fluids and catalysts as well as loss of thickness of the protective material.

Techniques to coat construction material with thin layers of resistant or immune metals or coking-resistant metals, such as Sn and Cu, are described in U.S. Pat. No. 5,863,418 and EP-A-0903424 and WO 03014263 A1. Such thin layers, approximately <200 µm thick, will be consumed by metal loss due to erosion and evaporation, as well as by reaction with the construction material, resulting in inadequate service lives at temperatures above approximately 500° C. Periodic re-coating of the surfaces exposed to corrosive gases requires either dismantling the process equipment and cleaning the surfaces to be coated and finally coating them or cleaning and re-coating them within the process equipment. The first method requires long shut-down periods, the second expensive re-designing and the development of, as of today, non-existing methods for in-situ cleaning and coating as well as for checking the integrity of the produced films. Therefore, periodic re-coating of thin coats will not be technologically and commercially practicable.

The alternative method to construct solid Cu-base members referred to in "THE ALUMINIUM BRONZES", MACKEN, P J, SMITH, A A, COPPER DEVELOPMENT ASSN., 55 SOUTH ARDLEY STREET, LONDON W. 1, SECOND PUBLICATION 1966, CDA PUB. NO. 31, 263 PP; 1966 is not an option above approximately 500° C. for pressurized components or components that in some other way have to maintain structural integrity during their entire service life, due to the low mechanical strength of copper alloys above 400–500° C.

The use of such short lived solutions will therefore not remove the presently prevailing sense of uncertainty around operational concepts as predictability of maintenance costs and secondary damage risks related to outbreak of metal dusting attacks on process equipment.

The use of such short lived solutions is therefore not likely to support a broad industrial acceptance of new emerging and energy efficient reforming design solutions, i.e., designs which are set to lower investment and operational costs of petrochemical and chemical plants and increase environmental sustainability, by reducing the requirement of hydrocarbon feedstock, and concomitantly reducing green house gas emissions.

Particularly, such solutions which feature thin coatings on load-carrying components or construction materials suffer from being short lived, and differ substantially from this solution in this specific respect.

SUMMARY

An exemplary product resistant or immune to carburization, metal dusting and coking and resistant to oxidation, comprises a load-bearing member and a corrosion resistant member, wherein the corrosion resistant member has a thickness of at least 0.5 mm and is formed of a copper-base alloy including (in weight-%): Al 2 to 20, Si >0 to 6, one or more Rare Earth Metals, in an amount up to 1.0 wt-% of each Rare Earth Metal or a total amount of Rare Earth Metal of a maximum 3.0 wt-%, one or more of the elements iron, nickel, cobalt and manganese, in a total amount of a maximum to 20 wt-%, Cu balance, and normally occurring alloying additions and impurities.

An exemplary method of resisting carburization, metal dusting, coking and oxidation in environments containing CO and/or hydrocarbon and in solid carbon containing processes comprises providing a load-bearing member having a corrosion resistant member. The corrosion resistant member has a thickness of at least 0.5 mm and is formed of a copper-base alloy comprising (in weight-%): Al 2 to 20, Si >0 to 6, one or more Rare Earth Metals in an amount up to 1.0 wt-% of each Rare Earth Metal or a total amount of Rare Earth Metal of a maximum 3.0 wt-%, one or more of the elements iron, nickel, cobalt and manganese, in a total amount of a maximum to 20 wt-%, Cu balance, and normally occurring alloying additions and impurities.

An exemplary method of preventing metal dusting and coking of metal articles in environments containing CO and/or hydrocarbons and in solid carbon-containing processes comprises forming a metal article at least in part from an alloy including (in weight-%): Al 2 to 20, Si >0 to 6, one or more Rare Earth Metals, in an amount up to 1.0 wt-% of each Rare Earth Metal or a total amount of Rare Earth Metal of a maximum 3.0 wt-%, one or more of the elements iron, nickel, cobalt and manganese, in a total amount of a maximum to 20 wt-%, Cu balance, and normally occurring alloying additions and impurities.

It is therefore an object of the present invention to provide in some exemplary embodiments a copper-base alloy for use in CO-containing atmospheres, and/or hydrocarbon containing atmospheres or solid carbon containing processes, such as gasification of solid carbonaceous materials, thermal decomposition of hydrocarbons and catalytic reforming, particularly, catalytic reforming under low-sulfur, and low-sulfur and low-water conditions.

It is another object of the invention to provide in some exemplary embodiments a product resistant or immune to oxidation, especially resistant in CO-containing atmospheres, and/or hydrocarbon containing atmospheres or solid carbon containing processes, i.e., processes such as gasification of solid carbonaceous materials, thermal decomposition of hydrocarbons and catalytic reforming, particularly, catalytic reforming under low-sulfur, and low-sulfur and low-water conditions.

It is another object of the invention to provide in some exemplary embodiments a product that has a surface without the ability to catalytically activate the formation of solid coke.

It is a further object of the invention to provide in some exemplary embodiments a product which is resistant or immune to carburization, metal dusting and coking for use in CO-containing atmospheres, and/or hydrocarbon containing atmospheres or solid carbon containing processes such as gasification of solid carbonaceous materials, thermal decomposition of hydrocarbons and catalytic reforming, particularly catalytic reforming under low-sulfur, and low-sulfur and low-water conditions.

It is another object of the invention to provide in some exemplary embodiments a product resistant to loss of material by erosion or abrasion due to high gas velocities and suspended particles within the process gas stream.

Another object of the invention is to provide in some exemplary embodiments a product in which a Cu-base alloy which is resistant or immune to carburization, metal dusting and coking can be used at temperatures where copper-base alloys themselves have too low mechanical strength.

Another object of the invention is to provide in some exemplary embodiments a copper-base alloy as one component in a composite material in a minimum thickness of the corrosion resistant component of at least 0.5 mm for use at temperatures of 450–650° C. in said composite form and in a minimum thickness of the corrosion resistant component of at least 1.0 mm for use at temperatures above 650° C. in said composite form.

It is a further object of the invention to provide in some exemplary embodiments a load bearing structural member, and specifically to render the thus manufactured products a long service life in commercial applications.

It is another object of the invention to provide in some exemplary embodiments a product resistant to loss of material by copper evaporation.

BRIEF DESCRIPTION OF THE DRAWING FIGURES

The following detailed description of preferred embodiments can be read in connection with the accompanying drawings in which like numerals designate like elements and in which.

DETAILED DESCRIPTION

These objects and advantages disclosed herein can be fulfilled with a product composed of at least two different alloys as described in the following. The different alloys fulfill different requirements: the first is a load-bearing member, which provides the mechanical stability for the temperature and pressure required by the process. The surfaces exposed to metal dusting, carburizing and coking environments are covered with sufficiently thick layers of the corrosion resistant member.

The corrosion resistant member is formed by a Cu—Al base alloy with the following composition (in weight-%): Al: 2 to 20 weight-%, preferably 4 to 9 weight-%. The alloy may contain additional elements in order to optimize oxidation resistance or fabricability: Si: >0 to 6 weight-%, preferably 0.05 to 5%, more preferably 0.5 to 3%, most preferably 0.5 to 2%. Sum of Fe, Ni, Co, Mn: 0 to 20 weight-%. For optimum resistance to metal dusting, the sum of Fe+Ni+Co+Mn should be less than 6.0 weight-% and the amount of any individual element should be less than 4.0 weight-%. Most preferably, the sum of Fe+Ni+Co+Mn should be less than 1.0 weight-%. A more detailed description of the effect of different alloying additions follows below, in the section relating specifically to the corrosion-resistant Cu—Al base alloy.

Figure 1:
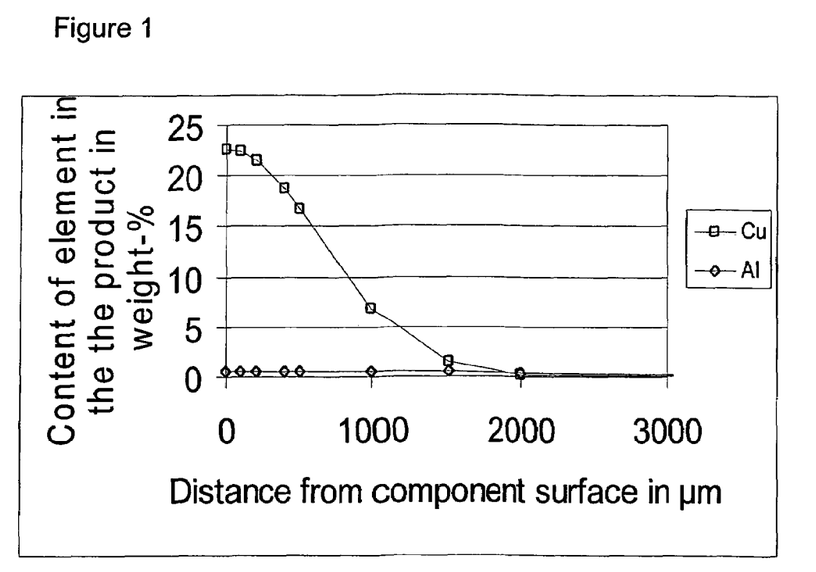
FIG. 1 shows the theoretical diffusion profile for Cu and Al after 4 years exposure at 750° C. of a Cu-8% Al film with an initial thickness of 200 μm.

It is possible to bond the load-bearing member and corrosion member mechanically. However, in order to give structural integrity to the entire product and to ensure sufficient heat conducting ability across the wall of the product, the different members joined with a metallurgical bond along the entire contact surface. The thickness of the corrosion resistant member is determined by the loss of material by evaporation, oxidation erosion and by diffusion into the load bearing component and the diffusion of element from the load bearing component into the corrosion resistant alloy. The diffusion process, which is illustrated in FIG. 1, leads to a successive deterioration of the corrosion resisting properties of the product if the thickness of the corrosion resistant alloy is too low. Therefore, if the product is intended for use over longer periods of time at temperatures over approximately 700° C., the thickness of the corrosion resistant alloy must be at least 1 mm. In the presence of further deteriorating mechanisms, such as copper evaporation and erosion, the minimum thickness is 1 mm even at temperatures in the range of 450 to 700° C. In the absence of these mechanisms, a thickness of 0.5 mm can be used at temperatures below 650° C.

Load-bearing member: The load-bearing member consists of an alloy with high temperature strength, such as, for example, UNS N08810, UNS N08811, UNS N06600, UNS N06601, UNS 34709, etc. The selected alloy should have a sufficiently high mechanical strength at the operating conditions of the product in terms of temperature, pressure drop across the wall of the component, and total load of the product (defined as the sum of the load from the weight of the load-bearing member and the weight of the corrosion-resistant Cu-base alloy). The selected alloy, in its as-delivered condition, fulfils relevant legal and standardisation requirements, e.g., pressure vessel approvals. Furthermore, if surfaces of the load-bearing member are not covered with a corrosion resistant alloy, the selected alloy itself should have sufficient corrosion resistance to the environment which it is exposed to.

Corrosion resistant member: The surfaces of the product exposed to carburization, metal dusting and coking, for use in CO-containing atmospheres, and/or hydrocarbon containing atmospheres or solid carbon containing processes, such as gasification of solid carbonaceous materials, thermal decomposition of hydrocarbons and catalytic reforming, particularly, catalytic reforming under low-sulfur, and low-sulfur and low-water conditions, are covered by a Cu—Al alloy that may contain additional elements to improve its properties. For use at temperatures of 450–650° C. in a composite form as described in the present invention, the minimum thickness of the corrosion resistant component should be at least 0.5 mm. For use at temperatures over 650° C., the minimum thickness of the corrosion resistant component should be at least 1.0 mm.

Below, the effects of different alloying elements in the corrosion resistant alloy are described and specified.

Aluminium: Aluminium promotes the formation of a protective alumina layer on the surface of the alloy in the temperature range of 300° C. to 1300° C. even in environments that solely contain trace amounts of oxygen. Aluminium can be added in amounts up approximately 9 weight-% without causing any major deterioration of the mechanical properties. It is estimated that this level is sufficient to achieve a necessary corrosion resistance in the majority of considered applications. If necessary, higher Al levels may be used, but in those cases, the ability of the alloy to be cold formed is limited. However, such levels may be used for example in hot-extruded sections such as circular tubes or in hot-rolled bar or plate. Aluminium should be added in an amount of up to 20 weight-%, preferably up to 13 weight-%, most preferably up to 9 weight-%, but not less than 2 weight-%, preferably not less than 4 weight-%.

Silicon: Silicon can be used in order to promote the protective effect of aluminium in this type of alloy by forming aluminosilicates, which have higher formation rates compared to that of pure alumina. In this type of alloy, the lower starting temperature for the formation of a protective oxide is favorable. Therefore, silicon can be added to the alloy in order to improve the oxide formation at low temperatures, especially if the content of Al is below approximately 8%. However, silicon has the effect of markedly decreasing the melting point of the alloy. The practical maximum in silicon content is 6% for some embodiments. Therefore, the content of silicon in some embodiments of the alloy is >0 to 6%, preferably 0.05 to 5%, more preferably 0.5 to 3%, most preferably 0.5 to 2%.

Nickel, iron, cobalt, manganese: Transition metals, especially iron, nickel and cobalt, have a strong catalytic effect on the formation of coke. The protecting capacity of the alumina layer, which will be formed on the surface of the alloy, allows proportionately high levels of these elements, but not more than a total of 20 weight-% of iron, nickel and cobalt.

Nickel, and, to a minor degree cobalt, can be used in order to (i) increase the maximum temperature of use by increasing the melting point of the alloy up to approximately 1100° C., and consequently (ii) allow the use of production methods that involve steps through temperatures above the melting point of a binary Cu—Al alloy, which is approximately 1030 to 1080° C., and (iii) improve the mechanical strength of the alloy at increased temperatures, from approximately 800° C. to approximately 1100° C.

An increased content of nickel, cobalt, iron and/or manganese can lead to an improved tendency of carburization and to a decreased resistance to metal dusting and coking. Therefore, the content of these elements should be kept as low as possible while still allowing the use of effective production methods. A practical maximum above which the deterioration of the corrosion resistance is expected to be prohibitive is 20 weight-%. The nickel in the alloy can completely or partly be replaced by iron and/or cobalt.

A pure Cu—Al-alloy according to embodiments of the present invention has a melting point between 1030° and 1080° C., dependent on the content of Al. If an optimum resistance to metal dusting and coking is desired, the content of each of the elements in the group Fe, Mn, Ni, Co should be less than 4.0 weight-% per element. The total content of these elements should in that case not exceed 6.0 weight-%, preferably not exceed 1.0 weight-%.

Iron can be used to improve the hot working characteristics of Cu—Al alloys, and it can therefore be added in amounts of up to 10 weight-%, preferably up to 5 weight-%, most preferably 0.5 to 4 weight-%.

Reactive Additions: In order to further increase the oxidation resistance at higher temperatures, a certain amount of reactive elements, such as Rare Earth Metals (REM), e.g., yttrium, hafnium, zirconium, lanthanum and/or cerium, can be added. One or more of this group of elements can be added in an amount not exceeding 1.0 weight-% per element, preferably not exceeding 0.3 weight %. The total content of those elements should not exceed 3.0 weight-%, preferably not exceed 0.5 weight-%, most preferably 0.01 to 0.2 weight-%.

Copper: The main component is copper, which balances the alloy. Copper is resistant or immune to catalytic activity and coking. Until today it has not been possible to use pure copper in these applications, due to its high oxidation rate when in contact with oxygen. The alloy comprises up to 98 weight-% Cu, but at least 60 weight-% Cu, preferably at least 74 weight-%, most preferably at least 80 weight-% Cu. It is clear to the person skilled in the art that a substitution of some of the Cu for Zn will only result in minor property changes for the alloy.

Further, the alloy comprises normally occurring alloying additions and impurities. These are defined as follows:

Alloying additions: Elements can optionally be added for process metallurgical reasons, for example, added in order to obtain melt purification from, e.g., S or O, or added in order to improve the workability of the cast material. Examples of such elements are B, Ca, and Mg. In order for such elements not to have a harmful effect on the properties of the alloy, the levels of each individual element should be less than 0.1%. In addition, several of the elements previously mentioned, e.g. Al, Si, Ce, Fe and Mn can also be added for process metallurgical or hot workability reasons. The allowable concentrations of these elements are as defined in the previous sections.

Impurities: Impurities refer to unwanted additions of elements from contaminants in the scrap metal used for melting or contamination from process equipment.

Some exemplary embodiments of the present alloy can be machined or manufactured by conventional metal working or metal forming processes, to a composite construction material in the shape of tubes, pipes, plates, strip and wire. It can also be produced by deposition of the corrosion resistant alloy onto the surface or surfaces of a semi-finished product of the load bearing alloy using known deposition techniques.

DESCRIPTION OF PREFERRED EMBODIMENTS OF THE INVENTION

Examples 1 to 5 are related to the corrosion resisting properties of the Cu-base alloy, in particular its resistance to metal dusting, carburization and coke formation and its ability to form a protective oxide with an excellent self-healing ability and the choice of composition of such an alloy. Examples 6 to 9 are related to the detailed design of a finished product fulfilling certain requirements in terms of mechanical properties as well as corrosion resistance.

EXAMPLE 1

Static laboratory experiments were executed in a tube furnace in a strongly coking atmosphere. The metal dusting resistance of stainless steel of standard quality and the Cu-base alloys A to M of the present invention was measured and evaluated. Table 1 shows the chemical compositions of the investigated materials. Table 2 shows the compositions of the embodiments A to Q according to the present invention. All contents are given in weight-%.

The test samples were cut from plates or bars into a rectangular shape with dimensions of approximately 10×12×3 mm and prepared by grinding with 600 mesh. Some of the test samples were surface treated by a standard pickling operation in 1.8M $HNO_3$+1.6M HF at 50° C. during 8 to 40 min. or treated by an electro polishing operation (50 g $CrO_3$+450 ml ortophosphoric acid, 20V). The samples were cleaned in acetone prior to testing and placed in the cold furnace. In order to reach a low oxygen partial pressure, pure hydrogen was flushed through the furnace for three hours before introducing the reaction gas and heating to temperature. The gas flow rate was 250 ml/min, which corresponds to a gas velocity over the specimen of 9 mm/s. The temperature was stabilized at 650° C. after 20 minutes heating. The input composition of the reaction gas was 25% CO+3% $H_2O$+72% $H_2$. The laboratory exposure was conducted at 650° C./1000 h in a quartz tube furnace with a diameter of 25 mm. Four temperature cycles down to 100 to 200° C. and back to 650° C., each with a duration time of about 4 to 5 h, were conducted in order to raise the carbon activity and promote initiation of metal dusting.

Figure 2:
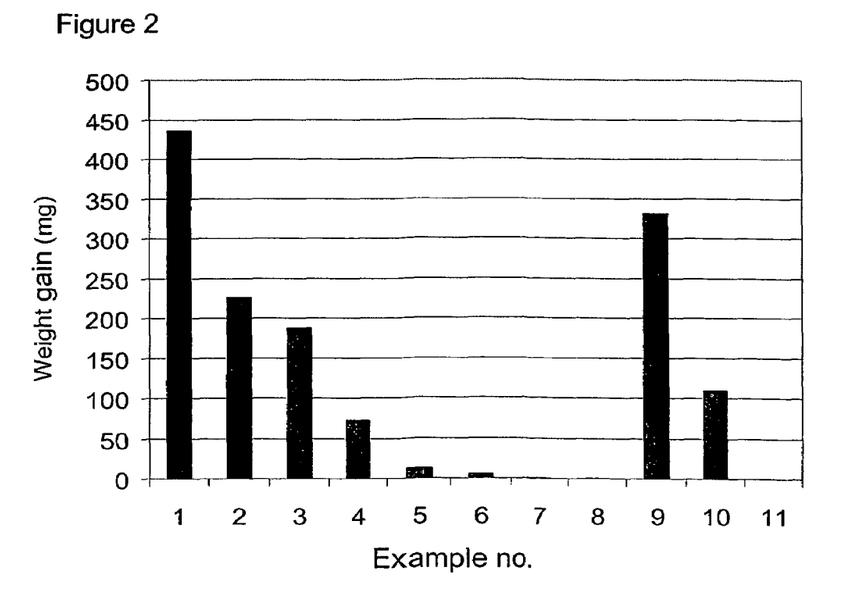
FIG. 2 shows diagrammatically the weight loss of some comparative samples and one exemplary embodiment of the present invention after exposure at 650° C. over a period of time of 1000 hours (4 cycles to RT) in $25CO+3H_2O+H_2$.

The results are presented as weight loss measurements after cleaning the samples from coke and graphite as presented in FIG. 2, where the samples were as indicated in Table 3.

TABLE 3

| Comparative Example no. | Alloy | Product condition | Surface modification |
|---|---|---|---|
| 1 | 304L | Bar | Annealed |
| 2 | 304L | Bar | Electro-polished |
| 3 | 304L | Bar | Ground |
| 4 | 304L | Bar | Pickled |
| 5 | 304L | Plate | Annealed |
| 6 | 304L | cold rolled plate | Ground |
| 7 | 304L | cold rolled plate | Electro-polished |

TABLE 1

| Example no. | C | Cr | Ni | Mo | N | Si | Mn | P | S | Ti | Ce |
|---|---|---|---|---|---|---|---|---|---|---|---|
| 304L (bar) | 0.013 | 18.35 | 10.15 | 0.39 | 0.043 | 0.42 | 1.26 | 0.024 | 0.004 | | |
| 304L (plate) | 0.015 | 18.20 | 10.10 | 0.39 | 0.043 | 0.43 | 1.42 | 0.021 | 0.001 | — | — |
| Alloy 800HT | 0.063 | 20.37 | 30.10 | 0.05 | 0.009 | 0.73 | 0.53 | 0.009 | 0.001 | 0.5 | — |
| 353MA | 0.052 | 25.10 | 34.10 | 0.20 | 0.175 | 1.56 | 1.40 | 0.020 | 0.001 | — | 0.06 |

TABLE 2

| | Al | Ni | Fe | Si | Mn | Cr | Co | Ce | Zr | La | Cu |
|---|---|---|---|---|---|---|---|---|---|---|---|
| A | 8.0 | 0.02 | 0.02 | | 0.005 | 0.002 | | | 0.0001 | | balance |
| B | 5.6 | <0.1 | <0.1 | 1.7 | <0.1 | <0.1 | <0.1 | | | 0.0014 | balance |
| C | 9.5 | <0.1 | <0.1 | 4.8 | <0.1 | <0.1 | <0.1 | | | 0.0012 | balance |
| D | 8.4 | <0.1 | <0.1 | <0.1 | <0.1 | <0.1 | <0.1 | | | 0.0004 | balance |
| E | 6.3 | <0.1 | <0.1 | 0.6 | 6.3 | <0.1 | <0.1 | | | 0.0007 | balance |
| F | 15.1 | 10.1 | <0.1 | <0.1 | <0.1 | <0.1 | <0.1 | | | 0.0004 | balance |
| G | 2.8 | <0.1 | <0.1 | 0.1 | <0.1 | <0.1 | <0.1 | | | 0.016 | balance |
| H | 6 | | | 2 | | | | | | | balance |
| I | 8 | | | 2 | 8 | | | | | | balance |
| J | 10.7 | 7.0 | | <0.1 | 6.6 | | | | | 0.0018 | balance |
| K | 15 | 15 | | | | | | | | | balance |
| L | 12.2 | <0.1 | <0.1 | <0.1 | <0.1 | <0.1 | <0.1 | | | 0.075 | balance |
| M | 4.9 | <0.1 | <0.1 | <0.1 | <0.1 | <0.1 | <0.1 | 0.068 | | 0.055 | balance |
| N | 9.6 | | | | | 5.0 | | | | | balance |
| O | 13.7 | | | | | 9.8 | | | | | balance |
| P | 10.5 | <0.5 | 3.5 | <0.1 | <0.1 | <0.1 | <0.1 | | | | balance |
| Q | 8.1 | <0.1 | <0.1 | 2.1 | <0.1 | <0.1 | | | | | balance |

TABLE 3-continued

| Comparative Example no. | Alloy | Product condition | Surface modification |
|---|---|---|---|
| 8 | 800 HT | plate | Ground |
| 9 | 800 HT | plate | Pickled |
| 10 | 353 MA | plate | Overpickled |
| 11 | Alloy A | plate | Untreated |

As shown in FIG. 2, all comparative steels (Examples 1–10) suffered from metal dusting with formation of pits and coke during the 1000 h exposure as function of the measurable weight gain. However, the alloy of the present invention (Example 11) was practically non-reactive in this atmosphere with no weight change or coke formation. Example 11 has been exposed for a total of 4000 hours in similar atmospheres (4×1000 h at 650° C.) without any measurable or visible changes.

EXAMPLE 2

The alloys according to the examples B to O with compositions according to Table 2 were produced by melting in a protective gas atmosphere of argon, followed by casting.

These alloys can, when exposed to oxidizing atmosphere in the temperature range of 300° to 1050° C., form a protective alumina or mixed aluminium containing oxide, which restrains further oxidation of the alloy and restrains evaporation of copper from the alloy, which makes the alloy more resistant to material loss by copper evaporation. This is illustrated in Table 4 which shows the average weight change per hour (g/(m² h)) after cyclic oxidation in air between 48 h and 454 h for 7 different Cu base alloys and which makes visible that there is little difference between the different alloys at 400° C. and 550° C.

Figure 3:
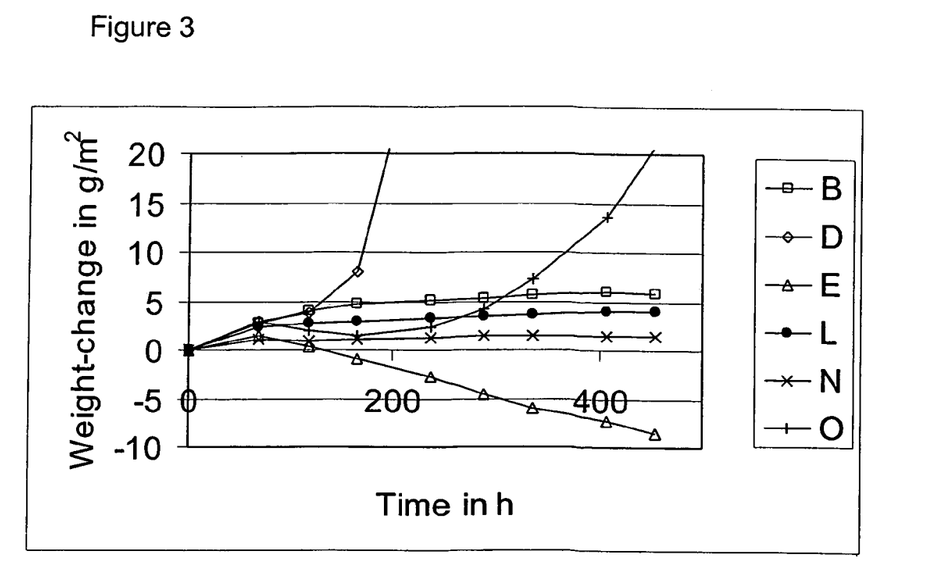
FIG. 3 shows the oxidation weight change during exposure to air at 850° C. for seven different corrosion resistant Cu—Al base alloys.

Alloy D is clearly inferior to the other alloys at higher temperatures with respect to oxidation. The oxide formed on alloy E is prone to spalling during cooling from 850° C. The superior oxidation resistance at 850° C. of alloys B, L and N is illustrated in FIG. 3. The results indicate that optimum oxidation resistance is achieved in alloys containing at least 9 weight-% Al or a combination of Al and Si such that Al+2*Si (in weight-%) is greater than or equal to 9. In the latter case, alloy B shows that a Si-content of 1.7 weight-% is sufficient to give adequate oxidation resistance to an alloy with 5.6 weight-% Al.

A Co-content of 5 weight-% does not result in deterioration of the oxidation resistance, but with a Co-content of 10 weight-% a minor deterioration of the oxidation resistance is evident. Likewise, 6.3 weight-% Mn causes the alloy to become sensitive to oxide spalling. It can be expected that iron and nickel have similar effects as manganese and cobalt with respect to the oxidation resistance. It can thus be concluded that for optimum oxidation resistance an alloy composition of 5 to 12 weight-% Al, 1 to 3 weight-% Si and less than 6 weight-% of Fe+Mn+Ni+Co is desirable.

EXAMPLE 3

The alloy according to example Q with composition according to Table 2 was produced by melting in a protective gas atmosphere of argon, followed by casting. The alloy was exposed to 23 mbar CO-gas at 600° C. for 465 h. The CO-gas was initially composed of a mixture of CO-molecules composed of $^{13}C$ and $^{18}O$ isotopes and CO molecules composed of $^{12}C$ and $^{16}O$ isotopes. By measuring the rate of transformation of $^{13}C^{18}O$ and $^{12}C^{16}O$ to $^{13}C^{16}O$ and $^{12}C^{18}O$ the catalytic activity of alloy Q with respect to breakdown and recombination of CO can be determined. The breakdown reaction is considered to be important as a first step in any metal dusting, carburization or coking process.

Figure 4:
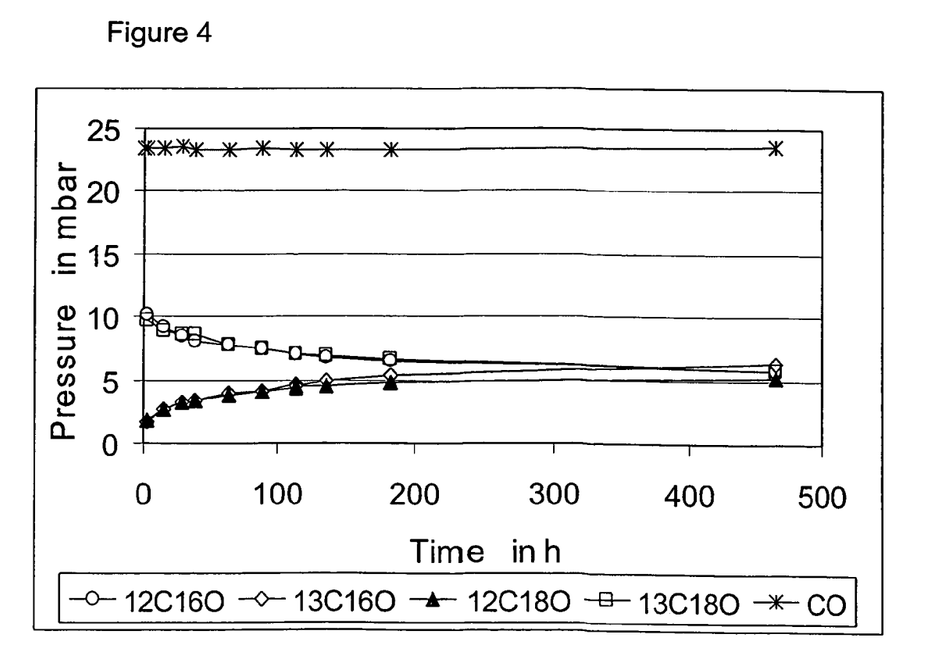
FIG. 4 shows the partial pressure of CO molecules with different isotope composition in a furnace kept at 650° C. containing a piece of alloy Q (disclosed herein).
Figure 5:
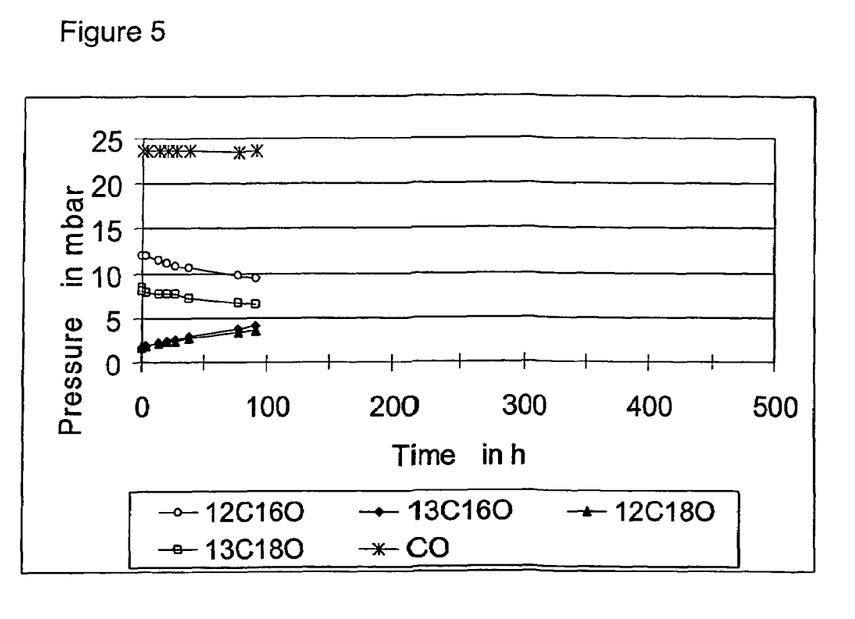
FIG. 5 shows the partial pressure of CO molecules with different isotope composition in an empty furnace kept at 650° C.

The transformation of $^{13}C^{18}O$ and $^{12}C^{16}O$ in the presence of alloy Q is shown in FIG. 4 measured by mass spectrometry. As a comparison, FIG. 5 shows the transformation of the same gases in an empty furnace. The furnace material is silica. There is no significant difference in the catalytic activity between Alloy Q and the empty silica furnace. The latter in turn can be considered as an inert material, i.e., alloy Q completely lacks or substantially lacks catalytic activity with respect to CO, and can thus be considered as a highly resistant or immune material with respect to metal dusting, carburization and coking in CO containing gases.

EXAMPLE 4

A laboratory exposure was performed in a tube furnace in a highly carburizing atmosphere. The relative tendency for coke formation at 1000° C. was evaluated between a standard grade stainless steel and several Cu-base alloys with compositions according to tables 1 and 2.

The test samples were cut from cast material into rectangular shape with dimensions of approximately 10×15×3 mm and prepared by grinding to 600 mesh. The samples were cleaned in acetone prior to testing and placed in the cold furnace. To reach a low oxygen partial pressure, pure hydrogen was flushed through the furnace for three hours before introducing the reaction gas and heating to temperature. The gas flow rate was 250 ml/min, which corresponds to a gas velocity over the specimen of 9 mm/s. The temperature stabilizes at 1000° C. after 30 minutes heating. The reaction gas had an input composition of 83% CO+17% $H_2$. The laboratory exposure was conducted at 1000° C./100 h in a quartz tube furnace with a diameter of 25 mm.

The results from the coking tests are presented in Table 5 as weight gain due to coke/graphite formation on the sample surface.

TABLE 5

| Material | Coke formation at 1000° C. [mg/cm²/100 h] |
|---|---|
| Alloy 800HT | 5.2 |
| P | 1.0 |

TABLE 4

| | B | D | E | L | N | O | P |
|---|---|---|---|---|---|---|---|
| 400° C. | 0.0024 | 0.0015 | 0.0049 | 0.0024 | 0.0048 | 0.0023 | 0.0016 |
| 550° C. | 0.0022 | 0.0013 | 0.0031 | 0.00095 | 0.0015 | 0.00094 | 0.0041 |
| 700° C. | 0.014 | 0.052 | 0.010 | 0.0073 | 0.015 | 0.017 | 0.012 |
| 850° C. | 0.030 | 0.58 | −0.038 | 0.022 | 0.0048 | 0.062 | 0.054 |

TABLE 5-continued

| Material | Coke formation at 1000° C. [mg/cm$^2$/100 h] |
|---|---|
| Q | 0 |
| L | 0 |
| N | 0.5 |

It is evident that even relatively small amounts of Co, Ni and Fe are detrimental to the coking resistance of the Cu base alloy. Therefore, it is clear that the total amount of Fe+Ni+Co+Mn should be below 3 weight-% in order to obtain optimum properties. However, even with a total content of Fe+Ni+Co+Mn of up to 6 weight-%, the alloy is superior to the standard material Alloy 800HT.

EXAMPLE 5

Figure 6:
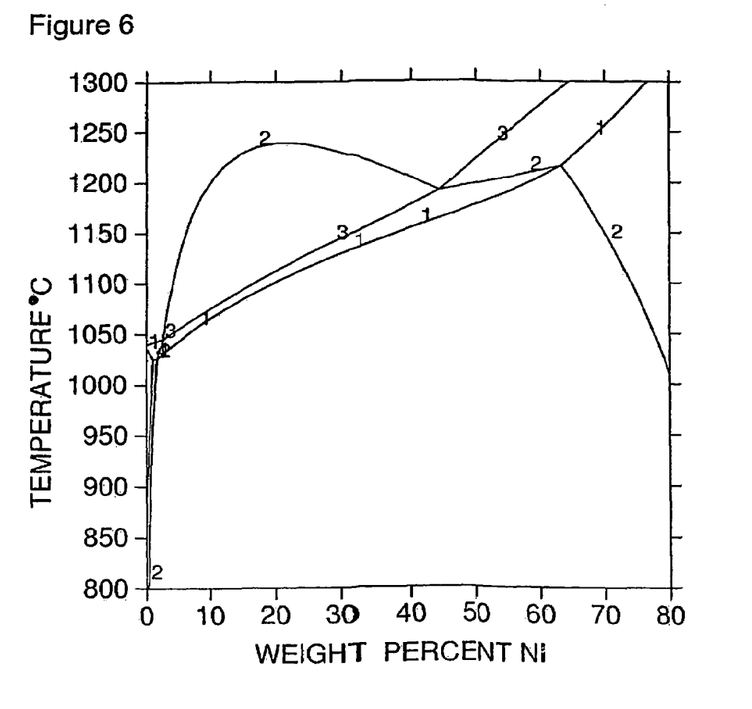
FIG. 6 shows a section in an phase diagram Cu—Ni—Al calculated with Thermo-calc for a given Al-content of 8 weight-%, where 1—liquid, 2—AlNi, 3—FCC, and 4—BCC.

FIG. 6 shows a section of a phase diagram Cu—Ni—Al calculated with Thermo-calc for a given Al-content of 8 weight-%. FIG. 6 shows the solidus/liquidus temperature 1, the area of stability for the phase NiAl 2, and the area of stability for the cubic close-packed solid solution of copper and nickel 3, which also can contain minor contents of, e.g., aluminium. FIG. 6 also shows the area of stability for the phase 4, which in the pure Cu—Al-system is called β.

FIG. 6 and Table 6 show the effect of different contents of copper, nickel and aluminium in an alloy of 92 weight-% (Cu+Ni) and 8 weight-% Al at the solidus- and liquidus temperatures. FIG. 6 indicates that by increasing the content of nickel above 20 weight-%, its melting point can be brought to exceed 1100° C.

Figure 7:
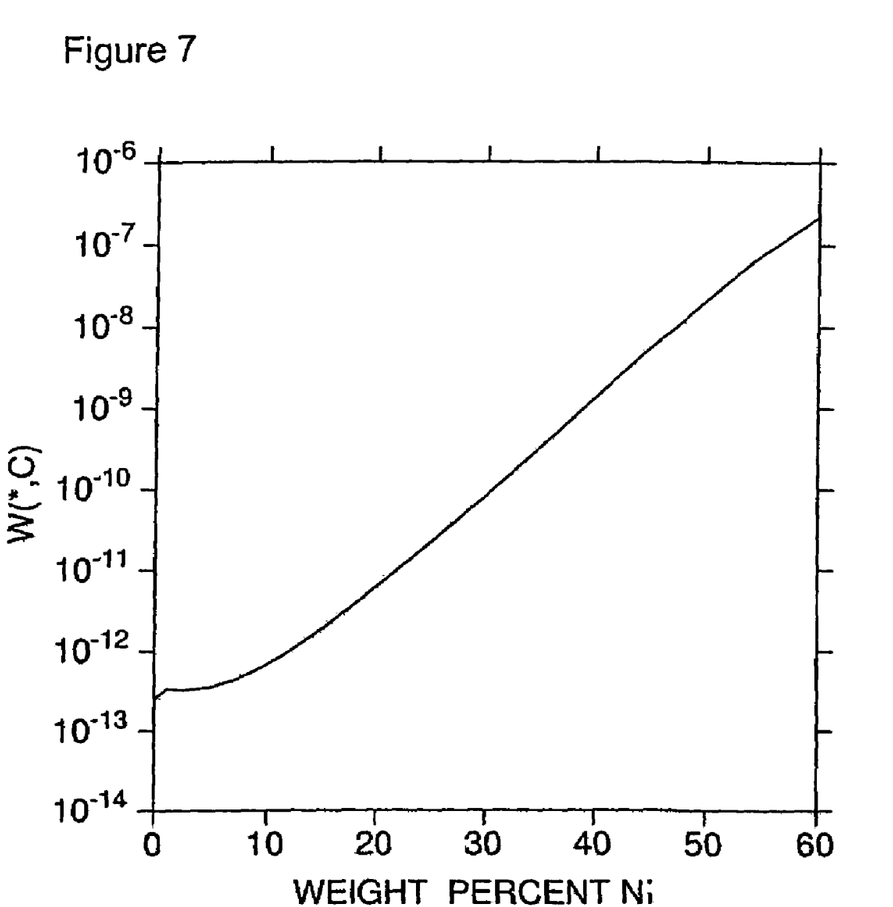
FIG. 7 shows the solubility of carbon (g carbon/g alloy) in an alloy with 4 weight-% Al and a varying Cu—Ni-relation at 750° C.

FIG. 7 and Table 6 show the effect of the Ni, Cu and Al contents on the solidus temperature and carbon solubility in an Cu—Al—Ni alloy. The diagram shows, that for nickel contents above approximately 10 weight-% the solubility of carbon is strongly increased with increasing nickel content. The rate of carburization of an alloy is to a high extent determined by the solubility of carbon in the alloy and also the phenomena of metal dusting and coking are expected to increase with increasing carbon solubility. Therefore, it is desirable that the solubility of carbon in the alloy is as low as possible, and a consequence of this is that the nickel content should be lower than 10 weight-% in order to obtain an optimum resistance to carburization, coking and metal dusting, preferably lower than 1 weight-%.

The reason low levels of the Ni-content produce optimum properties is, that nickel, besides affecting the solubility of carbon also catalyzes coking, which is unfavorable.

TABLE 6

| Example | Ni [wt-%] | Al [wt-%] | Cu [wt-%] | Solidus temperature [° C.] | Carbon solubility at 750° C. [g carbon/g alloy] |
|---|---|---|---|---|---|
| R | 0 | 4 | 96 | 1070 | 2.50E−13 |
| S | 2 | 4 | 92 | 1080 | 3.30E−13 |
| T | 5 | 4 | 91 | 1090 | 3.50E−13 |
| U | 10 | 4 | 86 | 1100 | 6.60E−13 |
| V | 20 | 4 | 76 | 1130 | 5.00E−12 |
| W | 0 | 8 | 92 | 1040 | 9.65E−13 |
| X | 2 | 8 | 90 | 1030 | 8.22E−13 |
| Y | 5 | 8 | 87 | 1040 | 5.40E−13 |
| Z | 10 | 8 | 82 | 1070 | 3.00E−13 |
| AA | 20 | 8 | 72 | 1100 | 8.00E−13 |
| Comp. Ex. 1 | 60 | 4 | 36 | 1270 | 1.90E−07 |
| Comp. Ex. 2 | 60 | 8 | 32 | 1200 | 7.00E−08 |
| Comp. Ex. 3 | 30 | 4 | 66 | 1160 | 7.00E−11 |
| Comp. Ex. 4 | 40 | 4 | 56 | 1190 | 1.20E−09 |
| Comp. Ex. 5 | 50 | 4 | 46 | 1230 | 1.90E−08 |
| Comp. Ex. 6 | 30 | 8 | 62 | 1130 | 7.00E−12 |
| Comp. Ex. 7 | 40 | 8 | 52 | 1150 | 1.00E−10 |
| Comp. Ex. 8 | 50 | 8 | 42 | 1180 | 2.40E−09 |

EXAMPLE 6

An optional load carrier can be used at elevated temperatures, i.e., temperatures above approximately 400° C. For this purpose, a Cu base alloy can be machined to a component in a composite or bimetallic composite solution, which will be used as construction material in the different shapes as mentioned above. The latter is especially valid if the alloy has low contents of iron and nickel.

Embodiments of the product can be in the shape of tubes or plate or strip or wire, where the inner load-carrying layer is coated at one or both surfaces with the Cu base alloy specified in previous examples. Some of the methods, which can be used in order to produce a composite solution of the alloy and a load carrier are co-extrusion, co-welding or co-drawing and shrinkage of one tube on the load carrying component and one outer and/or inner tube of the alloy according to the invention, possibly followed by a heat treatment in order to obtain a metallurgical binding between the components. A similar method for the production of plate or strip is to hot- or cold-roll together two or more plates or strips. Composite plates or -tubes can also be produced by explosion welding of two or more different plates or tubes of a load carrier and the alloy according to the invention. An outer- and/or inner-component can also be applied on a load carrier by help of a powder metallurgical technique, such as HIP (Hot Isostatic Pressing) or CIP (Cold Isostatic Pressing). In these cases, the load carrier could be in the shape of tubes, pipes, plate, strip or wire or other suitable product form. After pressing, the formed composite will be further machined by, e.g., hot extrusion and/or welding, drawing and forging.

Other methods for the production of composite material are electrolytic coating of copper and aluminium on the load carrying component, possibly followed by an annealing in order to homogenize the coating or a gas phase deposition of copper and aluminium by, e.g., vaporization, pack cementation, sputtering, chemical vapor deposition (CVD) or other methods.

Aluminium and copper can also be deposited on the load carrier, e.g., by dipping in a melt or by overlay welding. These methods are possible to use in order to produce all of the above-mentioned product forms. Different coating methods can be used in order to supply copper and aluminium to the alloy. In such cases, a final heat-treatment homogenizes the alloy with the purpose to keep its corrosion properties.

Composite strip or composite plates, produced according to the description herein can be welded together to form longitudinal welded or helical welded composite tubes with the Cu base alloy on the inner and/or outside of the tube.

Suitable load carriers in the above mentioned product forms are such high temperature alloys, which today are used for their mechanical strength and oxidation resistance in the actual temperature range, but which have insufficient metal dusting, carburization, coking or nitridation resistance for use in the environments to which the present invention relates. This includes for temperatures lower than 700° C. martensitic or bainitic or ferritic iron alloys with additions of, e.g., chromium, molybdenum, vanadium, niobium, tungsten, carbon and/or nitrogen, in order to obtain mechanical strength at high temperature. At temperatures above approximately 500° C. it is in many cases common practice to use austenitic iron-chromium-nickel alloys, which are possibly mechanically strengthened as load carrier by alloying with, e.g., molybdenum, vanadium, niobium, tungsten, carbon and/or nitrogen. In both of those groups of alloys chromium and sometimes aluminium and/or silicon is used in order to give the load carrier an improved corrosion resistance. In those cases, where the product according to the invention is composed of such a load carrier covered on both surfaces with the corrosion resistant Cu base alloy, the Cu base alloy according to the invention will deliver the corrosion resistance that is required. By that means, alloys whose maximum temperature of use in other applications is limited by the corrosion resistance are being able to be used as load carriers at higher temperatures than otherwise. In those cases, where product according to the invention is only covered at one surface of the load carrier by the corrosion resistant Cu base alloy, the load carrier itself has a sufficient corrosion resistance in the environment its free surface is exposed to.

EXAMPLE 7

As an example of how a tubular product for use in metal dusting conditions is designed to meet the different requirements on such a product, a description of a finished tubular product follows.

The tube for use in applications where a corrosive gas exchanges heat with itself across the tube wall consists of a load bearing component of Alloy 800HT (UNS N08811) with a protective layer of a Cu-base alloy of composition Cu-8.5 weight-% Al-1.0 weight-% Si-0.5 weight-% Fe on both inner and outer surfaces. One example of such a tube has a diameter of 60.3 mm and a total thickness of 3.91 mm. In this finished product, the outer corrosion resistant layer has a thickness of 1.0 mm, and the inner corrosion resistant layer a thickness of 0.7 mm, whereas the load bearing component has a thickness of 2.2 mm. At 900° C., this means, that the maximum allowable pressure drop according to the ASME boiler and pressure vessel code, section VIII, division I, is approximately 5.5 bar. Since the gas exchanges heat with itself, the pressure drop across the tube wall is expected to be less than 5 bar, even in processes that operate at absolute pressures in the range 10 to 100 bar. Thus, the product described in the previous section fulfils the necessary requirements to be used at as high temperatures as 900° C.

It should be clear to the person skilled in the art that the tubular product with the corrosion resistant alloy covering only the inner or only the outer surface are also possible with a wide range of dimensions and compositions of the Cu base alloy and the load bearing alloy.

EXAMPLE 8

An example of this is a tube which conducts a gas with a carbon activity greater than unity at a temperature range of 450 700° C. in its interior and on its outer surface is cooled by air with temperature in the range 200 to 700° C. For this reason such a tube is covered with a metal dusting resistant Cu-base alloy on its inner surface, but the outer surface still has a sufficient oxidation resistance with respect to the hot air. Using a proven alloy such as Alloy 600 (UNS N 06600) with 6 mm wall thickness and 2 mm thick Cu-7Al-0.2Si-0.5 weight-% Ni alloy on the inner surface allows at least 10 years service life with an internal pressure of 10 bar.

EXAMPLE 9

A further example of this is a tube which conducts steam in its interior and which is heated from the outside by a gas with a carbon activity greater than unity at a temperature range of 200 to 600° C. In this case, the outer surface is exposed to the metal dusting conditions, whereas the inner surface is not exposed to any carbon related corrosion. For this reason, such a tube is covered with a metal dusting resistant Cu-base alloy on its outer surface, and an alloy with sufficient steam corrosion resistance and mechanical strength is used as the load bearing member. One alloy that fulfils these demands is Alloy 800HT (UNS N 08811). With a tube of outer diameter 50 mm and a wall thickness of 3.7 mm, using a 0.9 mm thick Cu-5.8 weight-% Al-1.0 weight-% Si layer on the outer tube surface, the Alloy 800HT thickness is 2.8 mm, which means that the maximum internal steam pressure that can be allowed is 100 bar.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A product resistant or immune to carburization, metal dusting and coking and resistant to oxidation, the product comprising:
   a load-bearing member comprising a martensitic or bainitic or ferritic iron alloy or an austenitic iron-chromium-nickel alloy; and
   a corrosion resistant member,
   wherein the corrosion resistant member has a thickness of at least 0.5 mm and is formed of a copper-base alloy including (in weight-%):

Al 2–20,

Si >0–6, one or more of Rare Earth Metals, hafnium and zirconium, in an amount up to 0.5 wt-% of each or a total amount of 0.01 to 0.5 wt-%,
   one or more of the elements iron, nickel, cobalt and manganese, wherein a total amount of Fe+Ni+Co+Mn is a maximum to 20 wt-%,
   Cu balance, and
   normally occurring alloying additions and impurities.

2. The product according to claim 1, wherein the thickness of the corrosion resistant member is at least 1 mm.

3. The product according to claim 1, where the copper-base alloy comprises 4 to 13 weight-% Al.

4. The product according to any of claim 3, wherein the copper-base alloy comprises 4 to 9 weight-% Al.

5. The product according to claim 1, wherein the copper-base alloy comprises up to 5 weight-% Si.

6. The product according to claim 5, wherein the copper-base alloy comprises 0.05 to 5 weight-% Si.

7. The product according to claim 6, wherein the copper-base alloy comprises 0.5 to 3 weight-% Si.

8. The product according to claim 1, wherein the total amount of Rare Earth Metals, hafnium and/or zirconium is 0.01 to 0.2 weight-%.

9. The product according to claim 1, wherein the load-bearing member and the corrosion resistant member are metallurgically bonded.

10. The product according to claim 9, wherein the load-bearing member and the corrosion resistant member are metallurgically bonded along an entire contact surface between the load-bearing member and the corrosion resistant member.

11. The product according to claim 1, wherein the product is a tube, pipe, plate, strip or wire.

12. The product according to claim 1, wherein Rare Earth Metals include one or more of yttrium, lanthanum and cerium.

13. The product according to claim 1, wherein the total amount of Fe+Ni+Co+Mn is less than 6 wt-%.

14. The product according to claim 13, wherein an amount of any individual element Fe, Ni, Co and Mn is less than 4.0 wt-%.

15. The product according to claim 1, comprising Fe in an amount up to 10 wt-%.

16. The product according to claim 15, wherein the amount of Fe is 0.5 to 4.0 wt-%.

17. The product according to claim 1, wherein Cu is at least 60 wt-%.

18. The product according to claim 17, wherein Cu is at least 74 wt-%.

19. The product according to claim 1, wherein Ni is 2–20 wt-%.

20. The method according to claim 1, wherein the austenitic iron-chromium-nickel alloy is UNS S34709.

21. The product according to claim 1, wherein the austenitic iron-chromium-nickel alloy is UNS N08810, UNS N08811, UNS N06600, or UNS N06601.

22. A method of preventing metal dusting and coking of metal articles in environments containing CO and/or hydrocarbons and in solid carbon-containing processes, the method comprising forming a metal article at least in part from the alloy according to claim 1.

23. The method according to claim 22, further comprising providing the metal article in the form of a tube, pipe, strip or wire.

24. The method according to claim 22, wherein a temperature of the environment is at least 1030° C.

25. The method according to claim 24, wherein the environment includes catalytic reforming under low-sulfur conditions or catalytic reforming under low-sulfur and low-water conditions.

26. A method of resisting carburization, metal dusting, coking and oxidation in environments containing CO and/or hydrocarbon and in solid carbon containing processes, the method comprising providing a load-bearing member having a corrosion resistant member, wherein the load-bearing member comprises a martensitic or bainitic or ferritic iron alloy or an austenitic iron-chromium-nickel alloy and wherein the corrosion resistant member has a thickness of at least 0.5 mm and is formed of a copper-base alloy comprising (in weight-%):

Al 2–20,

Si >0–6, one or more of Rare Earth Metals, hafnium and zirconium in an amount up to 1.0 wt-% of each or a total amount of 0.01 to 0.5 wt-%, one or more of the elements iron, cobalt and manganese, wherein a total amount of Fe+Ni+Co+Mn is a maximum to 20 wt-%, Cu balance, and normally occurring alloying additions and impurities.

27. The method according to claim 26, comprising joining the load-bearing member metallurgically with the corrosion resistant member.

28. The method of claim 27, comprising joining the load-bearing member with the corrosion resistant member by a metallurgical bond along an entire contact surface between the load-bearing member and the corrosion resistant member.

29. The method according to claim 26, comprising joining the load-bearing member mechanically with the corrosion resistant member.

30. The method of claim 26, wherein the environment includes gasification of solid carbonaceous materials, thermal decomposition of hydrocarbons or catalytic reforming.

31. The method of claim 26, wherein the environment includes catalytic reforming under low-sulfur conditions or catalytic reforming under low-sulfur and low-water conditions.

32. The method according to claim 26, wherein the total amount of Fe+Ni+Co+Mn is less than 6 wt-%.

33. The method according to claim 26, wherein an amount of any individual element Fe, Ni, Co and Mn is less than 4.0 wt-%.

34. The method according to claim 26, comprising Fe in an amount up to 10 wt-%.

35. The method according to claim 34, wherein the amount of Fe is 0.5 to 4.0 wt-%.

36. The method according to claim 26, wherein Cu is at least 60 wt-%.

37. The method according to claim 36, wherein Cu is at least 74 wt-%.

38. The method according to claim 26, wherein Ni is 2–20 wt-%.

39. The method according to claim 26, wherein the austenitic iron-chromium-nickel alloy is UNS 534709.

40. The method according to claim 26, wherein the austenitic iron-chromium-nickel alloy is UNS N08810, UNS N08811, UNS N06600, or UNS N06601.

* * * * *